United States Patent [19]

Evans et al.

[11] Patent Number: 5,362,562
[45] Date of Patent: Nov. 8, 1994

[54] CRIMPED ACRYLIC FIBERS HAVING IMPROVED THIXOTROPIC PERFORMANCE

[75] Inventors: Robert E. Evans, Huntington; Arutun Maranci, Westport; Stanley S. Kaminski, Stamford, all of Conn.

[73] Assignee: Cytec Technology Corp., Wilmington, Del.

[21] Appl. No.: 30,953

[22] Filed: Mar. 12, 1993

[51] Int. Cl.$^5$ ............................ D02G 3/22; D02G 1/00
[52] U.S. Cl. .................................... 428/369; 428/359; 428/394; 428/397; 428/401; 526/341; 526/342
[58] Field of Search ............................... 428/369, 401

[56] References Cited

U.S. PATENT DOCUMENTS

| | | | |
|---|---|---|---|
| 4,025,672 | 5/1977 | Hossenfelder | 427/388 |
| 4,038,452 | 7/1977 | Kobayashi | 428/224 |
| 4,691,002 | 9/1987 | Hegemann | 528/289 |
| 4,820,585 | 4/1989 | Tedesco et al. | 428/36 |
| 4,866,109 | 9/1989 | Hibbard et al. | 524/5 |
| 4,927,710 | 5/1990 | Tanaka et al. | 428/394 |
| 5,236,499 | 8/1993 | Chervenak | 106/612 |

FOREIGN PATENT DOCUMENTS 279491 6/1990 Germany .

OTHER PUBLICATIONS

A. Frances, "Kevlar ® Pulp for Viscosity", Research Disclosure, Apr. 1987, pp. 263-264.

*Primary Examiner*—Fred Zitomer
*Attorney, Agent, or Firm*—Frank M. Van Riet

[57] ABSTRACT

Crimped acrylic fibers with a small diameter, a minimum aspect ratio in the 20–50 range, and having a crimp of greater than about 10% so as to enhance the viscosity of polymers, resistance to gravity-induced slumping when applied to vertical surfaces, and mix stability, as well as provide matrix reinforcement and toughness, are adapted to act as improved physical thixotropes in adhesives, sealants, coatings, paints, grouts, building materials and the like.

23 Claims, No Drawings

CRIMPED ACRYLIC FIBERS HAVING IMPROVED THIXOTROPIC PERFORMANCE

The invention relates to the use of crimped acrylic fibers as thixotropes.

BACKGROUND OF INVENTION

Fibers have been added to organic and inorganic matrices to improve the viscosity and the handling characteristics of the mix and the toughness of the cured or solidified product. Fibers provide a combination of viscosity control and reinforcement, whereas particulate and chemical additives only improve viscosity. Asbestos fibers and other inorganic fibers, such as ceramic, glass, and the like, have been used in various resin systems to prepare sealants, mastics, putties and adhesive formulations. Health hazards in the use of asbestos are well known. Moreover, inorganic fibers, because of their intrinsic brittleness, can fracture during mixing to create a higher percentage of very short fibers, and these result in variability and loss of performance as fiber thixotropes, because short, broken fibers generally do not provide maximum reinforcement and viscosity enhancement.

The inorganic thixotropes have been supplanted to a significant extent by polymeric fibers, especially by fibrillated polyolefin and polyaramid fibers. Fibrillation is a means of texturizing which comprises stretching a fiber or film to fully or partially orient it and then breaking it transversely apart or mechanically abrading it to provide an interlaced fibrous structure. Such fibers induce high viscosities, but they are difficult to disperse in resins, and tend to result in inhomogeneous mixtures. Additionally, their adhesion to the cured resin is generally poor unless special surface treatments are carried out on the fibrillated fibers. Examples of such commercially available fibrillated polymeric fibers adapted for use as physical thixotropes are: KEVLAR ®, and ULTRATHIX ®, poly para-phenyleneterephtalimide, and PULPLUS ™, linear polyethylene, both products of the Du Pont Company, Wilmington, Del., USA. Also commercially available are polyethylene fibers sold under the tradenames SHORT STUFF ® and FYBREL ® by Minifibers, Inc., Johnson City, Tenn., USA. The use of KEVLAR ® aramid pulped fibers, in the range of from about 0.1 to 5.0% by weight, for viscosity control in poly(vinyl chloride) plastisols, in silicones, in epoxy resins, and in polyurethanes is described in Research Disclosure No. 29676, April 1987.

Acrylic fibers, e.g., fibers of a co-polymer containing acrylonitrile in a quantity more than 85 wt-%, have good extensibility, which prevents their fragmentation during mixing, and they adhere well to most resin systems because of the polar nitrile groups present in the molecule. These attributes make them desirable materials to consider for use where viscosity enhancement in resin systems is needed while maintaining or increasing the strength of the resulting resin-fiber composite. Modacrylic fibers with more than 35 wt % and generally less than 85 wt % acrylonitrile in the co-polymer provide also good extensibility, resistance to fragmentation during mixing and good adhesion to most resin systems, while also providing other attractive attributes such as fire retardancy. Consequently, they also are desirable materials for the present purpose.

The preparation of acrylic fibers by wet spinning, dry spinning, melt spinning, air gap spinning and flash extrusion are well known to those versed in the art.

The use of acrylic fibers having a diameter of less than 100 micrometers and a length of less than 3 millimeters as matting agents in paints has been described in U.S. Pat. No. 4,927,710. It is stated therein that the fiber aspect ratios must be less than 20. Fiber aspect ratio is defined as the ratio of the fiber length to its diameter (L/D). If fiber aspect ratios are above 20, the patent states that the fibers will bend and scratch the rollers used to process the paint. Typically, the disclosure continues, the concentration of the fibers in such paints are disclosed to be about 20% by weight. High fiber concentrations in the mix are permitted when L/D is 20 or less. However, where L/D values are larger, the viscosity greatly increases. When used in caulking and other building materials, this would produce a paste or dough too viscous to be pumped or sprayed even if thinned out at typically high shear rates. The Research Disclosure, cited above, for example, discloses that aramid pulp (or fibers) produces a dough at 5.0 wt % in a poly(vinyl chloride) plastisol. In any event, an increase in viscosity is not the object of U.S. Pat. No. 4,927,710, and in fact the object is to try to avoid such an increase.

In U.S. Pat. No. 4,820,585, is described the preparation of acrylic fiber bundles with improved dispersibility in mortars, concretes, plasters, thermosetting resins, and the like. Such aggregates are made from staple acrylic fibers having a diameter less than 50 micrometers and a length of more than 3 mm and less than 60 mm by bonding them, in bundles having at least 10 fibers per bundle, with various sizing agents. Dispersibility in organic and inorganic solvents is improved because the sizing agent, a water soluble polymer in the example cited, readily dissolves in water, allowing the fibers to disperse in a portland cement mixture. The fibers are not texturized, but special stretching techniques (at least 8 times stretch) and annealing techniques (heating at 150°–200° C., while stretched, then allowing the fibers to relax) are used in the manufacture of such acrylic fibers to make them strong reinforcing agents. Such heat treatments result in tenacities higher than 50 cN/tex and initial moduli greater than 1000 cN/tex, and these values are typical of fibers twice as strong and twice as stiff as would suffice in the typical fibrous thixotropes.

East German Patent Publication, DD-A1-279491, describes the use of acrylic fibers as physical thixotropes in resin systems. The diameter of the fibers is not specified, but the count number is given as 0.05 to 1.0 Tex, with specific examples of 0.52 Tex and 0.12 Tex. This, for the examples, corresponds to a diameter in the range of 23.8 to 11.4 micrometers. The cut length of the fibers in the claims is greater than 0.1 mm and less than 10 mm. By calculation, the aspect ratio of the fibers used in the examples in the East German Patent Publication ranges from 42 to 263.

The calculations leading to the numbers set forth immediately above are as follows:

Count claimed 0.05–1.0 Tex=7.4–33 micrometers

Length claimed 0.1–10 millimeters=100–10,000 micrometers

Coupling short length with small diameter-14<L/D<303

Coupling short length with large diameter-3<L/D<1351

The Examples use:

0.52 Tex/1 mm=L/D=42 and
0.12 Tex/3 mm=L/D=263.

The fibers of the East German Patent are not texturized, e.g., they are unlike the pulps and fibrillated fibers, mentioned above. In contrast to the U.S. Pat. No. 4,820,585, the East German Patent DD 279491 states that the fibers should not be agglomerated in order to facilitate incorporation into the resin system.

In U.S. Pat. No. 4,866,109 are described cut acrylic fibers and their use to reinforce materials such as plastics, rubbers, paints, cement, tar, petroleum residues, polymeric materials and paints. No mention is made of their use as physical thixotropes. The citation does disclose in Example IX that the fibers have a natural crimp of 3% resulting from normal processing conditions. Example IX of the patent is described to produce an unsatisfactory gasket sheet. By the term "crimp", as used herein, is meant the A.S.T.M. D 123, D-13 definition, that is "the difference in distance between two points on the fiber as it lies in an unstretched condition and the same two points when the fiber is straightened under specific tension, expressed as a percentage of the unstretched length." Mathematically, the percent crimp is expressed as follows:

$$\frac{\text{extended length} - \text{crimped length}}{\text{extended length}} \times 100 = \% \text{ Crimp}$$

The normal processing conditions are taught in Col. 6 of U.S. Pat. No. 4,866,109 to involve drawing and annealing, such as was used to produce the thermooxidatively stabilized fibers of the above-mentioned prior art, especially the East German Patent Publication. In any event, U.S. Pat. No. 4,866,109, suggests in Col. 6, that, if crimping is desired, a suitable apparatus, like a stuffing box, should be employed with the stretched acrylic tows. It is noted that all of the working examples in the patent used fibers chopped from tow having the 3% "normal" crimp, in other words, they were not texturized by crimping.

In summary, the citations above show that, in the present state of the art, fibrous organic thixotropes are known to be suitable replacements for inorganic thixotropes, like asbestos, and they generally comprise pulped polyolefin fibers, pulped aramid fibers, and unpulped heat-modified or chemically modified acrylic fibers. Pulped, or otherwise texturized acrylic fibers having more than the normal 3% crimp have not been described as physical thixotropes, and especially no acrylic fiber thixotropes having a special form of texturizing known in the textile art as crimped fibers, have been described for use as thixotropes.

It has now been discovered, and is the subject of this invention, that producing acrylic fibers by means of a texturizing process which at least induces crimping of greater than 3%, preferably greater than 5%, most preferably greater than about 10%, and especially preferably in the range of from about 30 to about 50% crimp along their length results in an unexpected enhancement in their ability to increase viscosity of resin systems, and at the same time decreases resin drainage and, remarkably improves the sagging resistance. For example, as will be shown later, keeping all other variables constant, crimping above 3%, e.g., 30–50%, alone, will increase the viscosity of a polysulfide resin containing 2% by weight of the respective fibers by a factor ranging from 1.25 to 2.2; crimping above 3%, e.g., 30–50%, alone will reduce the vertical slump of a polysulfide resin composition containing 1.25% by weight of the respective fibers by a factor of 0.1 to 0.5; and crimping above 3%, e.g., 30 –50%, alone will increase the resin yield stress in a rheometer by a factor of 2 to 8 and decrease the tendency of resin to separate from the fiber, i.e., dewet, by a factor of 3 to 6, (based on comparing Examples 5–6 and 5A and 6A). Such results are nowhere foreshadowed by the prior art and demonstrate manifest advantages in using fibers prepared in accordance with the present invention as physical thixotropes. It will also be shown that the effectiveness of the fiber as a reinforcement is greater than other inorganic and organic thixotropes.

It is a principal object of the present invention to provide microdenier acrylic fibers, i.e., fibers with a denier less than 1.0, and having greater than 3% crimp to act as a physical thixotrope in adhesives, sealants, coatings, building materials, and the like while maintaining satisfactory mixing, processing and surface characteristics. The working examples hereinafter will show that the fibers act as physical thixotropes by forming an interlocking matrix in the substrate fluid when at rest and orienting parallel to the direction of shear when flowing. The fibers can be unfibrillated or in the form of a pulp. The comparative examples will demonstrate that the fibers provide excellent rheological properties because of crimping to greater than 3%, all other variables being constant. Extensibility (elongation) of elastomeric materials is also increased compared to other fibrous thixotropes. Because of the good UV resistance and low moisture absorption of the fibers, they are well suited for outdoor applications. Also, because of their good hydrocarbon and other chemical resistance they are well suited as fuel tank and chemical tank sealant components.

The thixotropic effect of the fibers can be controlled by changing the fiber architecture, including fiber length and diameter. As will be shown hereinafter, the thixotropic effect of the fibers can be defined in terms of the fiber aspect ratio and the volume fraction, when the aspect ratio exceeds a critical minimum.

SUMMARY OF THE INVENTION

According to the present invention, there are provided crimped, microdenier acrylic fibers with a small diameter, a minimum length in the range of 0.5–3 mm, a minimum aspect ratio (L/D) in the 20–50 range, having greater than 3%, prefeably greater than 5%, and most preferably, greater than 10% crimp, and adapted to act as a physical thixotrope in adhesives, sealants, coatings, building materials and the like.

In preferred embodiments, there are provided thixotropic agents produced from crimped fibers of a polymer containing acrylonitrile in a quantity more than 35 wt %, and especially more than 85 wt %, the fibers having a fiber diameter less than 100 microns, a fiber length greater than 0.5 mm, a minimum aspect ratio in the range of 20–50, and being crimped to greater than 3%, preferably greater than 5%, and most preferably, greater than 10% so as (i) to provide improved viscosity to a matrix polymer,
(ii) to provide a composite of a polymer and the thixotropic agent having greater resistance to slumping than the resistance to slumping of a composite comprising the polymer and a thixotropic agent comprising the corresponding uncrimped, non-texturized fibers, and (iii) to provide improved resistance to separation of the fiber from the resin, i.e., dewetting.

In another aspect, the present invention provides compositions comprising (a) a resin or a combination of a resin and fillers and-/or other conventional additives, and (b) an effective concentration of a physical thixotrope comprising crimped acrylic fibers with a small diameter, a minimum length in the range or 0.3–3 mm, a minimum aspect ratio (L/D) in the 20–50 range, and having greater than 3%, preferably greater than 5%, and most preferably, greater than 10% crimp.

In preferred features the invention contemplates texturized fibers as defined above wherein the acrylic fibers are non-fibrillated; those comprised of a polymer containing acrylonitrile in a quantity more than 35 wt %; those having an average diameter in the range of about 2–15 micrometers and a crimp of greater than 10%; and those having an aspect ratio (L/D) of greater than about 100.

In addition, preferred features of the present invention comprise compositions as defined above wherein the resin comprises a curable resin selected from a polyester, a polyacrylate, a phenolic, a silicone, a polyurethane, natural or synthetic latex or rubber, a polyimide, a polyepoxide, a polysulfide, or a combination of any of the foregoing; those wherein the concentration of the physical thixotrope is from about 0.05 to about 10.0 parts by weight per 100 parts by weight of (a) and (b) combined; preferably those wherein the concentration of the physical thixotrope is from about 0.5 to about 5.0 parts by weight per 100 parts by weight of (a) and (b) combined.

Special mention is made of compositions as defined above wherein the minimum aspect ratio (L/D) is equal to or greater than $$4.6/(v)^{\frac{1}{2}}$$

wherein v is the volume of fibers in a unit volume of the resin fiber mixture; and those fitting the following equation: viscosity in poise of the mixture of (a) and (b), Vis(mix), is approximately equal to $$Vis(resin)\{1 + 110(L/D)(v)^{3/2}\},$$

wherein v is the volume of fibers in a unit volume of the resin fiber mixture, (L/D) is the aspect ratio and Vis(resin) is the viscosity in poise of the resin.

DETAILED DESCRIPTION OF THE INVENTION

The term "acrylic fibers", as used herein and in the appended claims include fibers obtained by the wet-spinning or dry-spinning of homopolymers of acrylonitrile, of copolymers containing at least 85% by weight of acrylonitrile, the residue being an ethylenically unsaturated comonomer copolymerizable with acrylonitrile, or blends of polymers wherein the total content of polymerized acrylonitrile is higher than 70% by weight. The term also includes "modacrylic fibers" which are copolymers comprising from 35 to 85% by weight of polymerized acrylonitrile. The fibers can be "normal" modulus or "high" modulus fibers, the former generally having a modulus as measured by ASTM Test Method D3822 in the range of 100,000 to 800,000 psi (0.1 to 0.8 msi), and the latter having a modulus in the range of 800,000 psi to 4,000,000 psi (0.8 to 4 msi). The molecular weight of the polymers is not particularly critical, and can range from about 10,000 to about 500,000, preferably $>100,000$, on the $M_w$ basis. The polymers can be surface finished, using conventional sizing agents or they can be unfinished. Thermally stable i.e., pre-oxidized, acrylic fibers can be used. A variety of shaped cross-sections, i.e., non-round fibers, can be used without departing from advantages of the invention.

The term "texturized" when used with acrylic fibers herein and in the appended claims is intended to include all known processes to produce fibers for textured yarns, including, but not limited to, taking partially or fully drawn monocomponent or bicomponent filaments or tows and processing them into the desired texture e.g., by coiling, curling, crimping and waving. Methods for such texturizing techniques are described in detail in reference texts, among which is mentioned, "Textiles: Fiber to Fabric", B. P. Corbman, New York, McGraw-Hill, Inc., Fifth Edition, 1975, pages 73–90. A preferred texturizing technique for producing the acrylic fibers used in the present invention is "crimping", which provides an accordionlike characteristic to the yarn. The methods for accomplishing this can very, thereby giving somewhat different shapes to the fibers, but producing somewhat similar effects. Among the types of crimps are those produced by a stuffer box in which the thermoplastic acrylic yarn is stuffed into a container and heat-set in the crimped condition thereby forming a random zigzag crimp. In another, the gear method, crimps are put into thermoplastic tow or yarn by employing the teeth on heated gear wheels. As the yarn is passed between the wheels, it is crimped into a jagged fashion in conformation to the gears and is heat-set. In still another method the fiber tow is fed into a crimping zone four times faster than it emerges, causing the fiber to be compressed in its length and thereby becoming crimped. Heat is applied and the crimp is thereby permanently set. Jet crimping can also be used, in which yarn is guided into contact with high velocity air jets, heated and set. Machines which can be used to process acrylic fibers in tow form by heat-stretching, breaking, and crimping are available commercially, e.g., the Tow Stapler, manufactured and sold by Turbo Machine Company. Crimping apparatus and processes are described in the art, U.S. Pat. No. 2,575,839, showing stuffing boxes and U.S. Pat. No. 2,917,784, showing crimping wet stretched tow. Crimping can also be produced by exposing to heat and/or moisture specially prepared bicomponent fibers with differential shrinkage in the components. Cutting the acrylonitrile-containing fibers is carried out with well-known equipment and by well-known procedures which are standard in the synthetic fiber industry; see for Example the disclosure in the above-mentioned U.S. Pat. No. 4,866,109.

The fiber diameter is required to be small, i.e., less than 100, and preferably less than 40, micrometers. especially preferably the fibers will have an average diameter in the range of about 2–15 micrometers. It is necessary that the fibers have a minimum length in the range of 0.3–3 millimeters, and a maximum length of about 6 millimeters. When the fiber diameter and length exceeds these limits, dispersion into the resin can become difficult, and reinforcing effects can be adversely affected. A most important characteristic is the aspect ratio, length divided by diameter (L/D). It has been found that aspect ratios must be no less than about 20–50, and preferably substantially higher, 100, and even up to 200. Higher than about 200, however, generally limits the volume of fibers that can be used. The aspect ratio can be increased by using the smaller diameter fibers, or longer fibers with the larger diameter fibers. If the aspect ratio falls below 20–50, the viscosity increase becomes unacceptably small. The upper limit of the aspect ratio is quite high, and is reached only when the composition with resin has an unextrudably high viscosity, e.g., of the order of 200,000 poise. The best balance of properties seems to be achieved with fibers of 5 to 12 micrometer diameters and lengths between about 0.5 and 5 millimeters.

The effective amount of the fibers to be used will vary widely, but in general it will be an amount which is within the range used in the prior art, which is typically from about 0.05 to about 10 parts by weight of fibers per 100 parts by weight of fibers and resin and/or resin and conventional additives combined, depending mostly on the resin system used, the desired viscosity, and the range of reinforcement desired. In general, however, an amount in the range of from about 0.5 to about 5.0 parts by weight of physical thixotrope per 100 parts by weight of fibers and resin system, combined, will be used, with the ideal amount being easily determined by those of ordinary skill in this art.

The resin compositions can be prepared readily by simply mixing the thixotrope into the resin system with conventional mixers, such as ribbon blenders, vertical or horizontal blenders, Koneaders, helical mixers, Sigma mixers, Banbury mixers, two roll mills, single and twin screw extruder mixers and other known blenders. The compositions can be applied to areas of ultimate use also in conventional ways well known to those skilled in the art, such as by brushing, spraying, pumping, injecting, and the like.

The resin matrices can contain conventional additives in conventional amounts, such as pigments, dyes, fillers, heat stabilizers, antioxidants, plasticizers, lubricants, UV-stabilizers, flame retardant agents, processing aids, foaming agents, and the like in order to further improve the properties, including processability, of the resin composition.

The illustrative examples which follow are intended to show how the texturized acrylic fiber physical thixotropes of the invention exhibit improved properties in resin systems.

DESCRIPTION OF THE PREFERRED EMBODIMENTS

The following examples illustrate the invention. They are not intended to limit the claims in any manner whatsoever. All parts are by weight, unless otherwise indicated.

EXAMPLES 1–3 AND COMPARATIVE EXAMPLES 1A*–3A*

Unfibrillated acrylic fibers, 1, 2 and 3 mm in length and 10 micrometers in diameter and a crimp of approximately 30% were added to 98 parts of LP 32 polysulfide resin to prepare mixtures (Examples 1, 2, and 3, respectively), each containing 2 parts by weight of fibers. An important parameter that characterizes the fibers is their aspect ratio, which is defined as the ratio of the length of the fiber to its diameter in identical units. In the present instance the aspect ratio of the fibers was 100, 200 and 300, respectively. For comparison purposes, identical mixtures (Control Examples 1A*, 2A* and 3A*, respectively) were made with fibers having no intentionally imparted crimp, i.e., 3% maximum (this crimp represents that obtained from normal processing conditions, i.e., without texturizing).

To insure good mixing, a putty knife was used to spread the mixtures on a glass plate and the mixtures were continuously sheared until they were uniform. Microscopic examination of the samples showed that the fibers retained their original lengths by this treatment and were well dispersed. A Rheometrics RMS-605, configured as a cone and plate rheometer, was used to measure viscosity at 24 degrees centigrade as a function of shear rate. The viscosities for Examples 1, 2 and 3, respectively were 59340, 35300 and 33460 poise at 0.01 (1/sec) shear rate. The polysulfide resin without the added fibers had a viscosity of 600 poises under the same conditions and the viscosity did not change with changing shear rate.

Thus a hundredfold increase was realized at 0.01 (1/sec) shear rate. This behavior permits rapid dispensing of the mixture, when formulated into a sealant, through a nozzle under high shear rates, and at the same time imparts sag resistance to the mixture, when the latter is applied to a vertical wall and shearing is stopped.

The same composition was also tested at 21 degrees Centigrade using a Brookfield parallel plate viscometer in steady shear mode with a 3 mm gap and 75 mm diameter plate. The following results were obtained:

| Example | Fiber Aspect Ratio | Crimp | Brookfield Vis (poise) @ 0.04 sec$^{-1}$ | 0.08 sec$^{-1}$ |
|---|---|---|---|---|
| 1 | 100 | Yes | 23000 | 16000 |
| 2 | 200 | Yes | 25000 | 19000 |
| 3 | 300 | Yes | 27000 | 22000 |
| 1A* | 100 | No | 12500 | 7300 |
| 2A* | 200 | No | 20000 | 10500 |
| 3A* | 300 | No | 16000 | 10000 |

*Comparative Example

The foregoing data demonstrate that crimping to greater than 3% results in a substantial and significant increase in thixotropic efficiency.

EXAMPLE 4 AND 4A*

Sealants in two package systems consist of a resin package (Part A) which in addition to the resin contains fillers and thixotropic agents, while the curing agent is placed in a separate package (Part B). The viscosity behavior of Part A packages containing acrylic fibers was studied by mixing fibers in LP 32 polysulfide resin containing the following fillers and additives.

| Composition | Parts |
|---|---|
| Polysulfide Resin, LP 32 (Morton International) | 100.0 |
| Calcium Carbonate, wet ground | 20.0 |
| Titanium Dioxide | 10.0 |
| Sulfur | 0.1 |
| Stearic Acid | 1.0 |
| Triton ® X-100, wetting agent | 0.2 |

Acrylic fibers having various aspect ratios and % crimp were mixed in the above mixture using first a Sigma Mixer and then a three roll paint mill to uniformly disperse the fibers and the other additives. The concentration of the fibers in the mixture is expressed in parts by weight to 100 parts by weight resin (phr) and does not include the fillers. The following results were obtained by cone and plate viscometry using a Rheometrics RMS-605 mechanical spectrometer:

| Diameter (micron) | Length (mm) | Aspect Ratio | Fiber Concentration (phr) | Viscosity @ 1 rad/sec (poise) | Yield Stress (Pa) |
|---|---|---|---|---|---|
| CRIMPED FIBER (EXAMPLE 4) | | | | | |
| 10 | 3.2 | 320 | 1.25 | 7830 | 41.1 |
| UNCRIMPED FIBER (EXAMPLE 4A*) | | | | | |
| 10 | 3.2 | 320 | 1.25 | 4750 | 17.2 |
| Part A without fiber | | | 0 | 1240 | 0 |

The results show again significant improvement in viscosity and yield stress with the addition of crimped fibers.

The sagging of sealant formulations when they are placed on a vertical surface was measured using A.S.T.M. D2202 Slump Test. In this test the sag of the sealant is measured in inches at 23° C. and at 50° C. after 30 minutes in a vertical position. In this test, the sealant formulation which contained no fibers sagged 4.0 inches within 2 minutes, which is an excessive amount. In contrast, the sample containing 1.25 phr of about 30% crimped fibers, 10 microns in diameter and cut to 3.2 mm lengths (Example 1), had a sag of only 0.02 inches at 23° C. and 0.05 inches at 50° C., which confirms it to be a non-sagging sealant. Moreover in the same test, but substituting the composition containing fibers with <3% crimp (Example 4A*), the respective sags were 0.2 inches and 0.25 inches, showing that crimping enhances sag resistance, all other variables being constant.

EXAMPLE 5

Example 1 was repeated using DER 331 epoxy resin (Dow Chemical), and using the acrylic fiber used in Examples 4 and 4A*. In addition, acrylic fibers of 13 micrometers in diameter were used. Four compositions in all were prepared. Resistance to fiber-resin separation and dewetting was measured by measuring the drainage from a dollop weighing 8 grams, 1 inch in diameter after one-month's storage. The yield stress properties were measured in a Rheometrics RMS-605 mechanical spectrimeter under dynamic oscillation by extrapolation of the square root profile of viscosity/shear rate. The properties of the fibers and the results obtained are set forth in the following Table:

| Diameter (micron) | Length (mm) | Aspect Ratio | Fiber Concentration (phr) | Drainage Area (sq. in) | Yield Stress (MPa) |
|---|---|---|---|---|---|
| CRIMPED FIBER (EXAMPLE 5-6) | | | | | |
| 10 | 3.2 | 320 | 1.50 | 0.097 | 32.1 |
| 13 | 3.2 | 246 | 2.00 | 0.063 | 21.7 |
| UNCRIMPED FIBER (EXAMPLES 5/6A*) | | | | | |
| 10 | 3.2 | 320 | 1.50 | 0.604 | 4.4 |
| 13 | 3.2 | 246 | 2.00 | 0.365 | 10.0 |

These results show that viscosity enhancement is not specific to one resin alone but obtainable with other resin systems. Moreover, the results also show that crimping to above 3%, all other factors being constant, provides enhancements in system stability and yield stress with the crimped fibers in accordance with the present invention.

EXAMPLE 7

If the procedure of Example 1 is repeated, substituting fibrillated crimped fibers having about 30% crimp for the unfibrillated fibers, a polysulfide composition having its properties improved with the thixotropic fiber in accordance with this invention will be obtained.

EXAMPLE 8

If the procedure of Example 1 is repeated, substituting crimped fibers having about 30% crimp and a variety of lengths for the fibers having an average length of 3.2 mm and a uniform length distribution, a polysulfide composition having its properties improved with the thixotropic fiber in accordance with this invention will be obtained.

EXAMPLES 9-11

If the procedure of Example 1 is repeated, substituting crimped fibers having about 30% crimp and a fiber diameters of 2, 3, and 5 microns for the fibers having a diameter of 10 microns, polysulfide compositions having their properties improved with the thixotropic fibers in accordance with this invention will be obtained.

EXAMPLE 12

If the procedure of Example 1 is repeated, substituting crimped modacrylic fibers (50 wt % acrylonitrile-50 wt % vinyl chloride) having about 30% crimp, for the crimped acrylic fibers, polysulfide compositions having their properties improved with the thixotropic fibers in accordance with this invention will be obtained.

EXAMPLE 13

The 10 micrometer crimped fiber of Example 5 was washed in a solution of acetone and water to remove the normal fiber sizing, which was approximately 1% of the weight of the fiber. The drainage area test of Example 5 was performed on a composition of 1.5 parts fiber in 100 parts DER 331 epoxy resin. The drainage area was measured to be 0.08 square inches after one week storage. An identical composition containing unwashed, sized fibers drained 0.06 square inches in the same time period. The data indicate that removal of fiber sizing does not alter the effectiveness of the fiber thixotrope of the invention.

EXAMPLE 14

A high modulus, high molecular weight acrylic fiber having a modulus of 3.0 msi, a molecular weight ($M_R$) of 370,000, a crimp level of approximately 20%, a length of 3.2 mm and a diameter of 16 micrometers was evaluated in the drainage area test of Example 5 at a compositional level of 2.5 parts per hundred parts of DER 331 epoxy resin. The drainage area was found to be 0.12 square inches after one week storage, indicating high thixotropic efficiency.

EXAMPLE 15

A stabilized, preoxidized acrylic fiber (PANOX B, a trademark) having a crimp level of approximately 10%, a length of 3.2 mm and a diameter of 13 micrometers was evaluated in the drainage area test of Example 5 at a compositional level of 2.4 parts per hundred parts of DER 331 epoxy resin. The drainage area was found to be 0.25 square inches after one week storage, indicating high thixotropic efficiency.

It has been found that fibers act as thixotropes by forming three dimensional networks in the resin. There is a threshold of fiber concentration below which there is an insufficient number of fibers to fill the space with such a network and the resultant viscosity increases are small. However, this threshold concentration is not absolute, it depends on fiber aspect ratio.

For a cubic lattice the relationship connecting the threshold fiber aspect ratio (L/D) to the fiber concentration, expressed as a volume fraction (v=volume of fibers in unit volume of resin/fiber mixture), is given by:

$$(L/D) = 4.6/(v)^{\frac{1}{2}}$$

Fibers with aspect ratios equal to or greater than given by the above equation can form a network at the specified volume concentration. In that case the equation that predicts viscosity of the mixture is given by:

$$Vis(mix) = Vis(resin)[+110(L/D)(v)^{3/2}]$$

The relationships shown above permit the selection of the structural parameters and concentrations controlling thixotropic performance. Unlike work reported in the prior art where the performance of fibers as viscosity raisers was characterized solely by their dimensions, the present invention permits the specification also of fiber concentration as a parameter to achieve thixotropy.

In sealants and caulks excessive amounts of fiber thixotropes lead to stiff unextrudable mixtures which can not be processed. Such conditions prevail when the mix viscosity reaches about 200,000 poises. For the polysulfide resin LP-32 with an original viscosity of 600 poises, this upper viscosity limit is reached when $$L/D < 3/v^{3/2}$$

Conversely, the economical use of the fiber thixotrope requires that it should result in significant improvements in neat resin viscosity with small incremental additions. A five- to six-fold increase in the resin viscosity for each incremental 0.01 fiber volume fraction in the mix is an acceptable minimum. The fiber aspect ratio satisfying this requirement is given by $$L/D > 4.6/\sqrt{v}^{\frac{1}{2}}$$

It follows that to satisfy both conditions, the fiber aspect ratio is bounded by the relationship below:ps
$$3/v^{3/2} > L/D > 4.6/v^{\frac{1}{2}}$$

At a given volume fraction the use of fiber aspect ratios between these limits can provide a wide range of mix viscosities. The calculated values of the mix viscosity from the previously given viscosity equation are given in the table below for LP-32 resin to indicate the width of the possible range:

| Volume Fraction, fiber | Fiber L/D Minimum | Fiber L/D Maximum | LP-32, Mix Visc Minimum | LP-32, Mix Visc Maximum |
|---|---|---|---|---|
| 0.00 | — | — | 600 | 600 |
| 0.01 | 46 | 3000 | 3636 | 198600 |
| 0.02 | 32 | 1060 | 6574 | 198477 |
| 0.03 | 26 | 576 | 9516 | 198137 |
| 0.04 | 23 | 374 | 12744 | 198072 |
| 0.05 | 21 | 268 | 16076 | 198358 |

Thus in principle one can obtain a target sealant viscosity lying between the maximum and minimum limits using various combinations of fiber volume fraction and aspect ratios. Economy and other technical constraints, such as ease of mixing, homogeniety and mechanical properties of the cured sealant dictate which combinations are to be preferred. In general, fiber aspect ratios greater than 500 lead to serious mixing problems and therefore result in mix viscosities that fall short of the predicted value. In other instances, other performance requirements dictate the choice of favorable combinations.

For example, if the tear strength of the cured sealant is important, higher fiber volume fraction and lower aspect ratios are preferred, whereas highly stretchable cured sealants require lower fiber volume fraction with high aspect ratios. In the latter case, achieving a high fiber aspect ratio using small diameter (microdenier) fibers is preferred to cutting long lengths in order to preserve the homogeniety of the mix.

The above-mentioned patents, publications and test methods are incorporated herein by reference.

Many variations of the present invention will suggest themselves to those skilled in the art in light of the above detailed description. For example, in the examples above, acrylic fibers with circular cross-section are used and mixtures with resins are prepared which show thixotropic behavior of various degrees. If fibers with other cross-sectional shapes such as triangular, "C"-shaped, dog-bone, multi-lobal, rectangular, etc. are used, substantially the same results will be obtained. Instead of polysulfide and epoxy resins, thermosetting resins comprising polyesters, polyacrylates, phenolics, silicones, polyurethanes, natural and synthetic rubber and lattices, polyimides, mixtures of any of them and the like can be used. All such obvious modifications are within the full intended scope of the appended claims.

We claim:

1. A physical thixotrope comprising crimped acrylic fibers having a maximum diameter of less than 100 micrometers, a minimum length in the range of 0.5–3 mm, a minimum aspect ratio (L/D) in the 20–50 range and a crimp of greater than 3%.

2. Crimped acrylic fibers as defined in claim 1 which are non-fibrillated.

3. Crimped acrylic fibers as defined in claim 1 which are fibrillated.

4. Crimped acrylic fibers as defined in claim 1 comprised of a polymer containing acrylonitrile in a quantity more than 35 wt%.

5. Crimped acrylic fibers as defined in claim 1 comprised of a polymer containing acrylonitrile in a quantity more than 85 wt %.

6. Crimped acrylic fibers as defined in claim 1 which have a uniform length.

7. Crimped acrylic fibers as defined in claim 1 which comprise a mixture of lengths.

8. Crimped acrylic fibers as defined in claim 1 having an average diameter in the range of about 2–15 micrometers, and having a crimp of greater than 5%.

9. Crimped acrylic fibers as defined in claim 8 having an average diameter in the range of up to about 8 micrometers, and having a crimp of greater than 10%.

10. Crimped acrylic fibers as defined in claim 1 having an aspect ratio (L/D) of greater than about 100.

11. Crimped acrylic fibers as defined in claim 1 having a modulus of greater than about 0.8 msi.

12. Crimped acrylic fibers as defined in claim 1 having a molecular weight of greater than about 100,000 ($M_K$).

13. Crimped acrylic fibers as defined in claim 1 having a finished surface.

14. Crimped acrylic fibers as defined in claim 1 having a cross-section which is non-round.

15. Crimped acrylic fibers as defined in claim 1 which are pre-oxidized and thermally-stable.

16. A thixotropic agent produced from crimped monocomponent or bicomponent fibers of a polymer containing acrylonitrile in a quantity more than 35 wt %, said fibers having a fiber diameter less than 100 micrometers, a fiber length greater than 0.5 mm, a minimum aspect ratio in the range of 20–50, and being crimped to greater than about 5% so as (i) to provide improved viscosity to a matrix polymer, (ii) to provide a composite of a polymer and said thixotropic agent having greater resistance to slumping than the resistance to slumping of a composite comprising said polymer and a thixotropic agent comprising the corresponding uncrimped, non-texturized fibers, and (iii) to provide a composite having a greater resistance to fiber-matrix separation or dewetting.

17. A thixotropic agent as defined in claim 16, wherein said crimped acrylic fibers are comprised of a polymer containing acrylonitrile in a quantity of more than 85 wt %.

18. A thixotropic agent as defined in claim 16, wherein said crimped acrylic fibers have a uniform length.

19. A thixotropic agent as defined in claim 16, wherein said crimped acrylic fibers comprise a mixture of lengths.

20. A thixotropic agent as defined in claim 16, wherein said crimped acrylic fibers have an average diameter in the range of about 2–15 micrometers, and have a crimp of greater than 10%.

21. A thixotropic agent as defined in claim 20, wherein said crimped acrylic fibers have an average diameter in the range of up to about 8 micrometers, and have a crimp of greater than 20%.

22. A thixotropic agent as defined in claim 16, wherein said crimped acrylic fibers have an aspect ratio (L/D) of greater than about 100.

23. A thixotropic agent as defined in claim 16, wherein said crimped acrylic fibers have an average diameter in the range of about 5–15 micrometers, and have a crimp of greater than 10%.

* * * * *